Dec. 4, 1962  E. C. SEILS, JR  3,066,803
FILTER
Filed Sept. 26, 1958  3 Sheets-Sheet 3
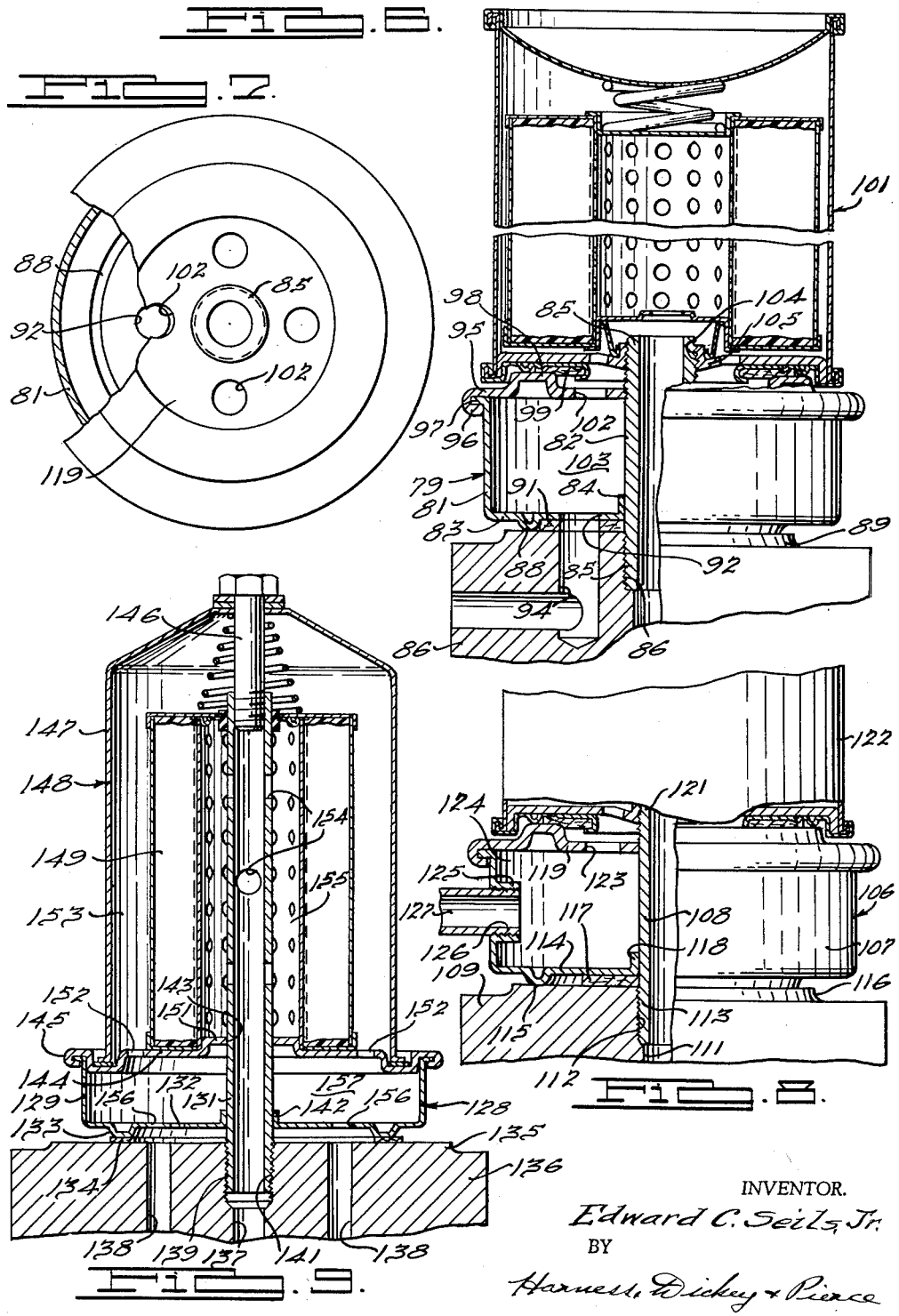
INVENTOR.
Edward C. Seils, Jr.
BY
Harness, Dickey & Pierce
ATTORNEYS.

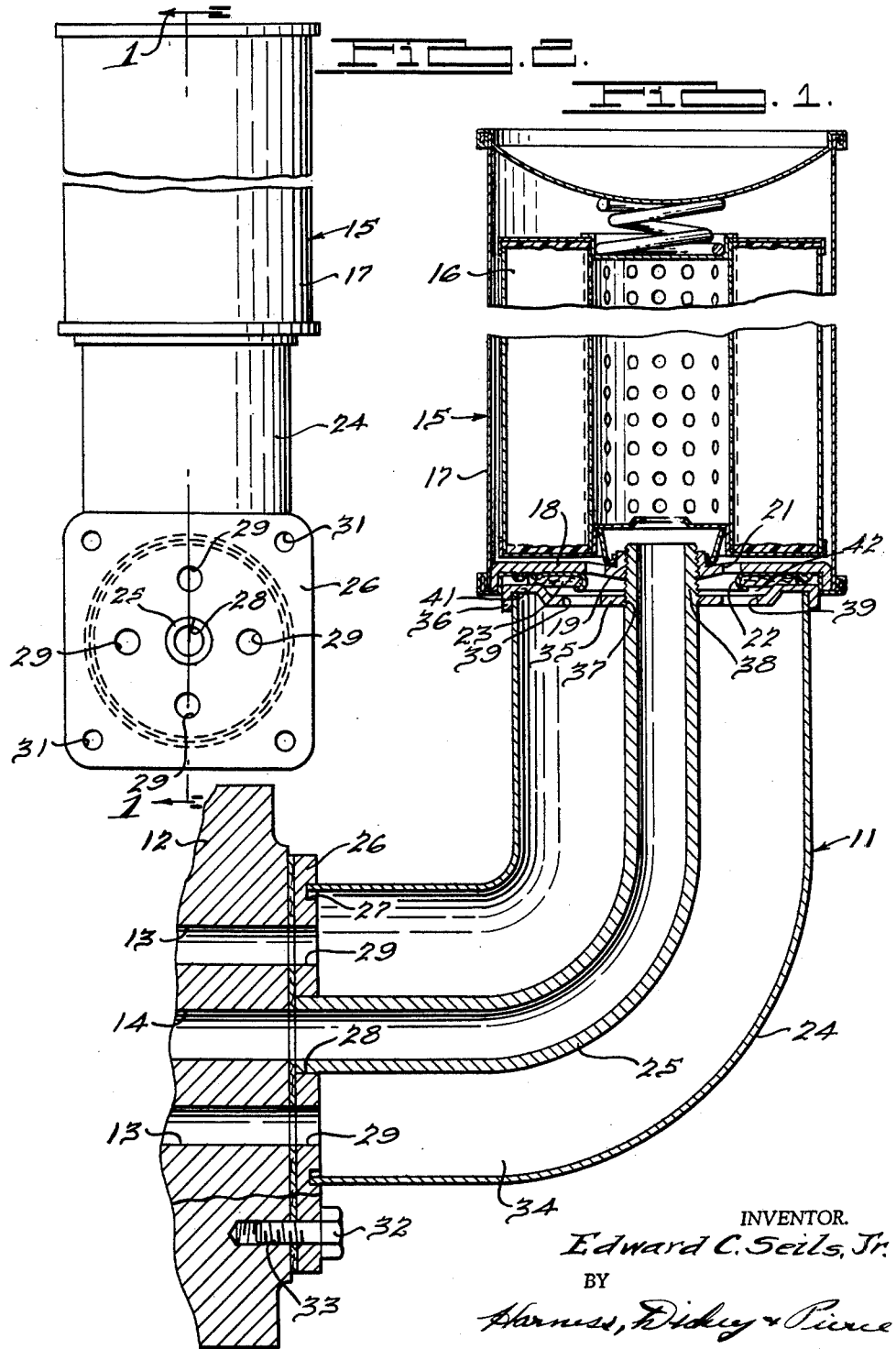

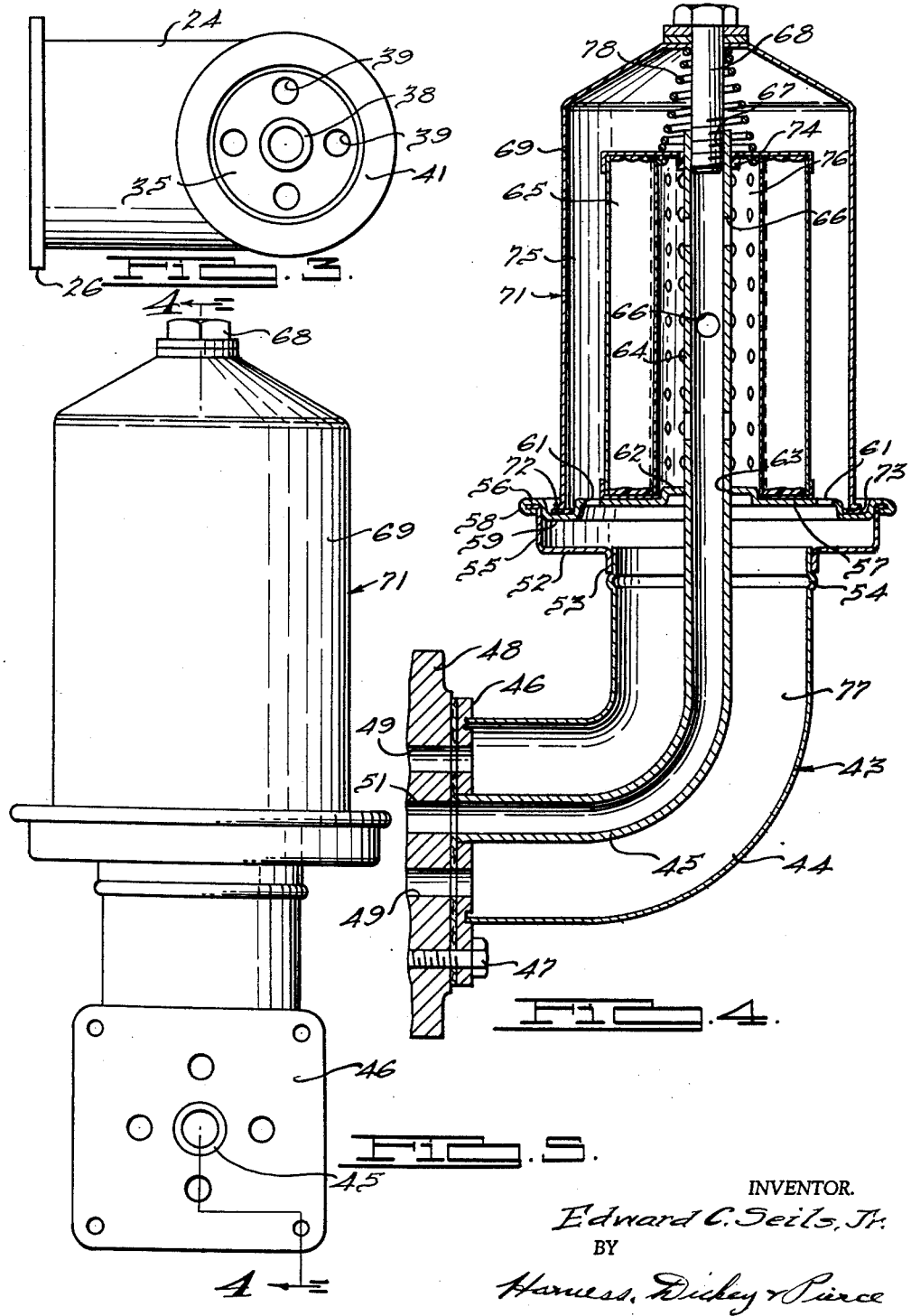

United States Patent Office 3,066,803
Patented Dec. 4, 1962

3,066,803
FILTER
Edward C. Seils, Jr., Racine, Wis., assignor, by mesne assignments, to Walker Manufacturing Company, Racine, Wis., a corporation of Delaware
Filed Sept. 26, 1958, Ser. No. 763,524
12 Claims. (Cl. 210—168)

This invention relates to filters, and more particularly to bases for supporting lubricating oil filters in conjunction with engine blocks or similar units.

It is an object of the invention to provide an improved filter base construction which is extremely economical to fabricate, may be made in a variety of shapes and configurations, and is especially adapted to support various types of disposable filters such as are in common use on automotive vehicles, in such a position as to be readily accessible for maintenance and replacement purposes.

It is another object to provide an improved filter base construction of the above nature which makes possible a substantial reduction in weight for a given capacity of filter, thus adapting the filter base for use in application such as aircraft installations where weight is an important factor.

It is also an object to provide an improved filter base construction of this character which is adapted for a variety of uses with regard to flow direction, location of external connections, and valve arrangements for by-passing a filter under certain conditions.

It is a further object to provide an improved filter base construction of the above nature which permits utilization of a wide variety of metals, both ferrous and non-ferrous, and a wide latitude in choice of fabrication methods, including the use of die cast, molded or extruded materials.

Other objects, features, and advantages of the present invention will become apparent from the subsequent description, taken in conjunction with the accompanying drawings.

In the drawings:

FIGURE 1 is a cross-sectional view in elevation taken along the line 1—1 of FIGURE 2 of one embodiment of the invention which is adapted to support a filter of a type in which both the filter element and casing are disposable, the filter being supported in upright position;

FIGURE 2 is an end elevational view of the base showing the mounting plate;

FIGURE 3 is a top plan view of the base with the filter removed;

FIGURE 4 is a cross-sectional view in elevation of another embodiment of the invention which is similar to the first embodiment but is adapted to support a filter of the type in which the filter element alone is disposable, the section being taken along the line 4—4 of FIGURE 5;

FIGURE 5 is an end elevational view of the filter base shown in FIGURE 4 and illustrating the mounting plate;

FIGURE 6 is an elevational view partly in cross section of another embodiment of the invention which is adapted to support a filter of a disposable cartridge type, in closely adjacent relation with an engine block;

FIGURE 7 is a plan view, with parts broken away, of the base of FIGURE 6 showing the configuration of the cover plate;

FIGURE 8 is a side elevational view, partly in cross section, of another embodiment of the invention which is similar to that shown in FIGURE 6 but provides an inlet connection in the base which is spaced from the base mount; and FIGURE 9 is a side elevational view in cross section of another embodiment of the invention which is adapted to support a filter of the disposable element type in closely adjacent relation with an engine block.

In general terms, the invention comprises a filter base fabricated of two coaxial tubular members, one of which serves to conduct fluid to the filter and the other to return the filtered fluid. The inner and outer members may be fabricated of tubing, and means are provided at adjacent ends of these members for securing the base on a mount such as an engine block which has one or more delivery ports and return ports. The coaxial members are of any desired length and may be provided with a curved configuration if desired. The opposite adjacent ends of the inner and outer base members are provided with means for supporting a filter which may be of a disposable cartridge type in which both the filter element and its casing are discarded, or a disposable element type. The supporting means for the filter also includes connections for feeding the unfiltered fluid to the filter element and returning it to the mounting end of the base. The various parts of the base are preferably formed of steel after copper is suitably applied and are copper brazed together at a temperature of about 2000° F. in a controlled atmosphere to provide mechanically sound as well as fluid-tight joints.

Referring more particularly to the drawings, the filter base in FIGURES 1 and 2 is generally indicated at 11 and is adapted to be mounted on one side of an engine block 12 or similar support having a plurality of fluid delivery ports 13 connected with the outlet of a pump (not shown), these ports being arranged around a filtered oil return port 14 leading to an oil gallery. The embodiment of the improved filter base shown in FIGURES 1 and 2 is adapted to support a filter generally indicated at 15 which is of a type in which both the filter element 16 and the casing 17 are disposable. A filter of this type is described and claimed in copending application, Serial No. 725,376, now abandoned, filed March 31, 1958 by La Vern R. Tietz, and assigned to the assignee of the present application. Although the details of the filter need not be presented here, since they do not form in themselves part of the present invention, such a filter includes a cover 18 having an internally threaded central portion 19 which is adapted to be threaded onto a projection from the base, and circumferentially spaced ports 21 surrounding portion 19 for the passage of fluid. A retaining plate 22 carries an annular seal 23 adjacent cover 19, the seal serving to prevent leakage of oil being fed through ports 21. Filter element 16, casing 17, cover 18, seal 23 and their associated parts form an integral disposable unit which may be assembled or disassembled from the base merely by screwing or unscrewing threaded part 19.

Filter base 11 comprises an outer tubular casing 24 and an inner tubular conductor 25, these parts being in substantially coaxial relation and being angularly bent in the illustrated embodiment so that, as will appear later, the base may be secured to one side of engine block 12 and support filter 15 in upright position for easy access. Casing 24 and conductor 25 may be fabricated of various materials, either metallic or nonmetallic, but are preferably steel tubing. A mounting plate 26 which is preferably a steel stamping is secured to adjacent ends of casing 24 and conductor 25, this plate having an annular groove 27 for the reception of casing 24, and a through central aperture 28 for conductor 25. The casing 24 and tube 25 preferably have a tight or press fit on the plate 26 to provide optimum conditions for copper brazing the parts together so as to give fluid tight joints between them. As seen best in FIGURE 2, plate 26 is provided with a plurality of apertures 29 which surround central aperture 28, so that apertures 29 may be aligned with ports 13 of engine block 12 when aperture 28 is aligned with port 14. A plurality of bolt apertures 31 are likewise provided in the corners of plate 26, which is of rectangular shape, so that base 11 may be secured to the engine block by bolts 32 which are received by threaded apertures 33 in the engine block. An apertured gasket may be disposed between mounting plate 26 and engine block 12 to prevent leakage.

It will be noted that apertures 29 are connected with annular chamber 34 formed between casing 24 and conductor 25. The upper ends of the casing and conductor carry a mounting plate or base cover 35 which is preferably a steel stamping and has an annular outer lip 36 tightly fitting over casing 24. Plate 35 is also provided with a central aperture 37 through which the upper end 38 of steel conductor tube 25 tightly projects, the exposed portion of the conductor being threaded so that portion 19 of filter 15 may be mounted thereon as previously described. The closely contacting surfaces of casing 24 and tube 25 with plate 35 are copper brazed together to provide mechanically strong and leakproof connections, it being apparent that the brazing of the plates 26 and 35 with tubes 24 and 25 will occur at one time under conditions suitable for copper brazing. Cover plate 35 is provided with a plurality of apertures 39 which are disposed inwardly of a raised annular portion 41, apertures 39 connecting with chamber 34 of the base. Ridge 41 will be engaged by annular seal 23 of filter 15 when the latter is threadably mounted on portion 38 of conductor 25, thus forming a chamber 42 which connects apertures 21 of filter 15 with apertures 39 of cover plate 41.

In operation, oil or other fluid to be filtered will be forced from ports 13 into chamber 34 from where the fluid will pass through ports 39 of cover 35, ports 21 of filter cover 18 and through filter element 16. The filtered oil will pass down through conductor 25 and into port 14. It will be noted that the base could be used with flow in the reverse direction, that is, with fluid being delivered to the filter through conductor 25 and returned through chamber 34. Because of its basic simplicity, the shape of the filter base may be varied to suit individual requirements by preselecting the length and configuration of casing 24 and conductor 25.

FIGURES 4 and 5 illustrate another embodiment of the invention which is basically similar to that shown in FIGURES 1–3 but which is adapted to support another type of filter in which the filter element alone rather than the complete filter unit is disposable. The base is generally indicated at 43 and comprises a tubular casing 44 and a tubular conductor 45 in coaxial relation as described previously. A mounting plate 46 is copper brazed to adjacent ends of the casing and conductor and is attachable by bolts 47 to an engine block 48 having pump delivery ports 49 and a return port 51.

The outer end of casing 44 carries an adaptor member 52 which may be fabricated from a drawn or stamped metal blank. Member 52 is of annular shape and has an inner flange 53 which tightly fits over casing 44, a circular ridge 54 being formed on the casing to locate the position of flange 53. Member 52 has a portion 55 extending axially in the same direction as casing 44, and an outwardly extending flange 56 surrounding the outer edge of portion 55. A filter mounting cover plate 57 is secured to flange 56 in a rolled joint 58, as seen in FIGURE 4, that provides good capillary action for copper brazing. An annular recessed portion 59 is formed on plate 57 inwardly of flange 58, and a plurality of apertured portions 61 in plate 57 are located inwardly of recessed portion 59. A raised portion 62 is provided at the center of plate 57, this raised portion having an aperture 63 through which conductor 45 extends with a press fit. Conductor 45 has a portion 64 which extends above plate 57 approximately the length of a filter element such as that indicated at 65, portion 64 of the conductor having a plurality of spaced apertures 66 for the passage of fluid. The upper end of conductor portion 64 has an internally threaded portion 67 for the reception of a bolt 68 used to secure a filter casing 69 in place. The parts are assembled and copper brazing gives strong, leak proof joints between plate 46 and tubes 44 and 45, between plate 52 and tube 44, and between plate 57 and tube 45 and plate 57.

The filter which base 43 is adapted to support is generally indicated at 71, and as previously mentioned, comprises a filter element 65 and a cylindrical casing 69. This type of filter construction is well known, casing 69 having a lower flange 72 adapted to engage an annular seal 73 which is disposed within recess 59. The diameter of raised portion 62 of cover plate 57 is such that it will be disposed within the central portion of filter element 65 as shown in FIGURE 4 when the filter element rests on the cover plate. Filter elements of this type are provided with an upper seal 74, and the diameter of tubular conductor portion 64 is such that seal 74 will engage the outer surface of the conductor portion, thus separating annular chamber 75, which is disposed between casing 69 and filter element 65, and inner annular chamber 76 which is disposed between conductor portion 64 and filter element 65. Apertured portions 61 of cover plate 57 are so located relative to chamber 75 as to form communicative passageways between this chamber and the inside of adaptor element 52, which in turn communicates with annular chamber 77 between casing 44 and conductor 45. A helical compression spring 78 is disposed between the upper end of filter housing 69 and filter element 65, thus holding the lower end of the filter element in tight engagement with cover plate 57 of the base.

In operation of the embodiment shown in FIGURES 4 and 5, base 43 will be secured to engine block 48 by means of bolts 47, and filter element 65 placed on cover plate 57. Spring 78 and filter housing 69 will then be placed in position and secured by bolts 68. With unfiltered oil flowing from ports 49 through chamber 77, this oil will pass through ports 61, chamber 75 and filter 65. The oil will then enter ports 66 and flow through conductor 45 to ports 51. It should be noted that the novel base construction not only provides proper support for the components of the filter 71 in an accessible position but cooperates with the filter parts to provide sealing surfaces where required. As in the previous embodiment, flow could be reversed so that ports 51 would be used to deliver unfiltered oil, with ports 49 returning the filtered oil.

FIGURES 6 and 7 illustrate another embodiment of the invention which is basically similar to the previously described embodiments but in which the base is adapted to support a filter in closely adjacent relation with an engine block. The base is generally indicated at 79 and comprises a casing 81 of tubular shape and a tubular conductor 82 coaxially disposed with the casing. As in the previous embodiments, all the parts are preferably steel, connected together in tight joints for good capillary action, and copper brazed together in these joints but may be fabricated of other suitable metallic or non-metallic materials. In the embodiment illustrated in FIGURES 6 and 7, both the casing and inner conductor are relatively short, and the casing is provided with an inwardly extending end portion 83 which has an inner flange 84 supporting the inner conductor. Tubular conductor 82 has a threaded portion 85 which is threadably mounted in an internally threaded bore 86 of an engine block 87, this bore forming part of a filtered oil return port. Flange 84 is brazed or otherwise secured in fluid-tight relation with the outer surface of inner conductor 82. An annular ridge 88 is provided on end portion 83 of casing 81, this end portion being adapted to engage a boss 89 on engine block 87, an apertured gasket 91 being disposed between these parts. The ridge 88 limits compression of the gasket 91 and also limits its radial expansion. End portion 83 of casing 81 is provided with a plurality of apertured portions 92 which are circumferentially spaced around central flange 84. These apertured portions are adapted to be aligned with infiltered oil delivery ports 94 in engine block 87.

The outer end of base 79 has a cover plate 95 with a rolled flange 96 which engages a lip 97 on casing 81. An intermediate portion of cover plate 95 has an annular ridge 98 for engaging a seal 99 on an oil filter generally indicated at 101. This filter may be of the disposable type as described with respect to FIGURES 1, 2 and 3. Cover plate 95 has a plurality of apertured portions 102 for conducting fluid from annular chamber 103 between casing 81 and tubular conductor 82. The tubular conductor has a threaded extension 104 projecting from plate 95, and threaded mounting portion 105 of filter 101 is adapted to be mounted on portion 104.

It should be noted with respect to the embodiment of FIGURES 6 and 7 that base 79 may be secured to engine block 87 merely by threading portion 85 of tubular conductor 82 into aperture 86. With filter 101 mounted on threaded portion 104 of conductor 82, base 79 will perform its filter-supporting as well as fluid-conducting functions in the same manner as described previously with respect to the embodiment of FIGURES 1–3. As in the previous embodiments, the components of base 79 may be fabricated of stamped or drawn parts and stock materials, and copper brazed together to provide mechanically strong and leakproof connections.

FIGURE 8 illustrates another embodiment of the invention which is basically similar to that shown in FIGURES 6 and 7 but in which one of the ports passes through the side of the base casing. The base is generally indicated at 106 and comprises a casing 107 and an inner conductor 108, both of which are tubularly shaped and coaxially disposed. Engine block 109 to which the base is to be attached has a single port 111 the outer end of which has a threaded bore 112, the inner end of tubular conductor 108 having a threaded portion 113 which is adapted to be threaded into bore 112 for mounting purposes. Casing 107, as in the previous embodiment, has an end portion 114 provided with an annular ridge 115 engageable with a boss 116 on engine block 109, a seal 117 being disposable between casing end portion 114 and boss 116. The inner end of casing end portion 114 has an inturned flange 118 fastened to tubular conductor 108. A cover plate 119 is provided as in the previous embodiment, and the outer end 121 of tubular conductor 108 is threaded for receiving a filter 122 of the disposable type. Cover plate 119 has a plurality of apertured portions 123 for communication between annular chamber 124 and the filter.

A port 125 is provided in one side of casing 107, this port as illustrated being in the form of a radially extending and internally threaded portion which projects inwardly toward chamber 124. This port is adapted to receive an externally threaded portion 126 of a tubular conductor 127 which may be connected, for example, with the delivery side of a pump (not shown). Oil delivered to chamber 124 will thus be fed to the filter through apertured portions 123 and return through inner tubular member 108 to port 111 of the engine block. The base components in this embodiment of the invention may be fabricated and fastened together in the manner described with respect to the previous embodiments.

FIGURE 9 illustrates still another embodiment of the invention in which a filter of the disposable element type is adapted to be mounted in closely adjacent relation with an engine block. The base is generally indicated at 128 and comprises a casing 129 of tubular shape and relatively short dimensions, and an inner tubular conductor 131. Casing 129 has an end portion 132 which is provided with an annular ridge 133, this ridge being adapted to engage an annular seal 134 on a boss 135 of an engine block 136. The engine block is of a type having a central port 137 which may be a filtered oil return port, and a plurality of inlet ports 138 surrounding port 137. Tubular conductor 131 has an externally threaded end portion 139 adapted to be received by an internally threaded bore 141 at the outer end of port 137. Inner conductor 131 extends through an inner flange 142 on end portion 132 of base 129, and through a central aperture 143 of a cover plate 144 beaded onto base 129 by an inturned flange 145, as in the embodiment of FIGURE 6. The upper end of tubular conductor 131 is adapted to threadably receive a bolt 146 which serves to hold down a housing 147 of a filter generally indicated at 148, this filter being of the disposable element type and having a filter element 149 which may be periodically removed and replaced. The central portion of cover plate 144 is raised as indicated at 151 for centrally locating and supporting filter element 149. A plurality of apertures 152 are likewise provided in cover plate 144, these apertures communicating with annular chamber 153 between filter element 149 and housing 147. Inner tubular conductor 131 is provided with a plurality of apertured portions 154 which serve to connect the bore of this conductor with annular chamber 155 within filter element 149.

In operation of the embodiment shown in FIGURE 9, unfiltered fluid will be admitted from ports 138 through apertured portions 156 of casing end portion 132 into casing chamber 157. The fluid will flow from chamber 157 through apertured portions 152 of cover plate 144 into annular chamber 153 and through filter element 149, returning through chamber 155, apertured portions 154 and tubular conductor 143 to port 137.

It will thus be seen that a novel and improved filter base construction has been provided which is extremely versatile in application and may be utilized to conduct fluid to and from a variety of different types of filters, the filter being supported by the base in a preselected position for easy accessibility. The basically simple construction of the filter base enables it to be fabricated in an extremely inexpensive manner, without sacrificing its durability or efficiency in operation.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a base for supporting a filter of the type having an annular filter element and a housing, a tubular casing, a tubular inner conductor extending through said casing, first and second closure plates extending between said casing and conductor at opposite ends of the base, mechanically rigid and fluid-tight connections between said closure plates and the casing and inner conductor respectively, means adjacent one of said closure plates for securing said base on an engine block or the like with said inner conductor in communication with a port of said block, means for conducting fluid from the outside of said casing to the annular chamber formed between the inner conductor and casing, a threaded portion on said inner conductor projecting outwardly from said second closure plate for receiving a filter fastening means with the filter directly engaging said second closure plate, means permitting communication between said inner conductor and the inside of said annular filter element, and apertured means in said second closure plate permitting communication between said annular base chamber and the annular chamber formed between said filter element and housing.

2. In a base for supporting a filter of the type having an annular filter element and a housing, a tubular casing, an inner tubular conductor extending through said casing, a mounting plate secured to adjacent ends of said casing and inner conductor, means for securing said mounting plate to an engine block or the like in a position such that said inner conductor communicates with a port in said block, apertured means in said mounting plate permitting communication between a second port in said block and the annular chamber formed between said inner conductor and casing, a cover plate secured to the opposite end of said casing and extending inwardly therefrom, said inner conductor passing through said cover plate and being secured thereto, a threaded portion at the outer end of said inner conductor for receiving a fastener for said filter to hold the filter directly against said cover plate, means permitting communication between said inner conductor and the inside of said annular filter element, and apertured means in said cover plate permitting communication between said annular base chamber and the annular chamber formed between said filter element and housing.

3. The combination according to claim 2, said cover plate being further provided with an annular portion adapted to cooperate with said filter to form an annular seal outwardly of said apertured means in the cover plate.

4. The combination according to claim 3, further provided with an adaptor member between said cover plate and tubular casing, said adaptor member having an inner flange secured to said casing and an outer flange secured to said cover plate.

5. In a base adapted to support a filter of a disposable cartridge type having an annular filter element and a housing, a casing of tubular shape, an inner conductor of tubular shape extending through said casing, a first closure plate at one end of said casing forming a mechanically rigid and fluid-tight connection with said casing and said inner conductor, a second closure plate at the opposite end of said casing forming a mechanically rigid and fluid-tight connection with said casing and said inner conductor, a threaded portion on said inner conductor projecting from said second closure plate, apertured means in said second closure plate outwardly of said inner conductor, and an annular ridge on said second closure member outwardly of said apertured means for cooperating with a disposable cartridge type of filter to form a seal therewith.

6. In a base for supporting a filter of the type having an annular filter element and a housing, a tubular casing, a tubular inner conductor extending through said casing, a first threaded portion at one end of said inner conductor and projecting from said casing, a second threaded portion on said inner conductor extending from the opposite end of said casing, first and second closure plates extending between said casing and inner conductor inwardly of said first and second threaded portions respectively, said closure plates having mechanically rigid and fluid-tight connections with said casing and inner conductor, said first threaded portion being adapted to be threadably secured in an engine block or the like so as to permit communication between said inner conductor and a port in said engine block, said second threaded portion being adapted to receive threaded mounting means for said filter so as to secure the filter to said base, means permitting communication between said inner conductor and the center of said filter element, an apertured portion in said second closure plate for permitting communication between said casing and the annular space between said filter element and housing, and an annular sealing portion on said second closure plate outwardly of said apertured portion and engageable by said filter.

7. The combination according to claim 6, said first closure plate comprising a portion of said casing integrally formed therewith and extending radially inwardly from said one end, an inturned annular flange at the inner end of said portion and secured to said inner conductor, and an annular ridge on said casing portion engageable with said engine block when said first threaded portion of the inner conductor is mounted therein.

8. The combination according to claim 6, said second closure plate comprising a cover plate having an outer rim secured to said casing and an inner edge secured to said inner conductor.

9. The combination according to claim 6, further provided with an apertured portion in said first closure plate for communicating the annular chamber between said casing and inner conductor with a second port in said engine block.

10. The combination according to claim 6, further provided with a port in the side of said tubular casing for communicating the annular space between said casing and inner conductor with a fluid connection.

11. The combination according to claim 6, said means for permitting communication between the inner conductor and filter element center comprising a plurality of apertured portions in the wall of said inner conductor.

12. In a base for supporting a filter of the type having an annular filter element and housing, a casing of tubular shape and curved configuration, an inner conductor of tubular shape and curved configuration extending coaxially within said casing, a first radially extending closure member at adjacent ends of said casing and inner conductor, means providing mechanically rigid and fluid-tight connections between said first closure member and said casing and inner conductor, means for securing said first closure member to an engine block so that said inner conductor is in communication with a port in said engine block, an apertured portion in said first closure member for permitting communication between the annular chamber formed by said casing and inner conductor and a second port in said engine block, a second radially extending closure member at the opposite end of said casing, mechanically rigid and fluid-tight connections between said second closure member and said casing and inner conductor, an apertured portion in said second closure member for permitting communication between said filter outwardly of said filter element and said annular chamber, a threaded portion on said inner conductor projecting from said second closure member for receiving threaded filter mounting means, means permitting communication between said inner conductor and the center of said filter element, and an annular sealing portion on said second closure member outwardly of said apertured portion for cooperation with the filter housing.

References Cited in the file of this patent

UNITED STATES PATENTS

| 2,071,529 | Howard | Feb. 23, 1937 |
| 2,323,160 | Stecher et al. | June 29, 1943 |
| 2,354,238 | Wilkinson | July 25, 1944 |
| 2,633,991 | Beatty | Apr. 7, 1953 |
| 2,707,967 | Adams et al. | May 10, 1955 |
| 2,871,035 | Kaiser | Jan. 27, 1959 |

FOREIGN PATENTS

| 702,168 | Great Britain | Jan. 13, 1954 |